United States Patent Office 3,189,407
Patented June 15, 1965

3,189,407
METHOD OF RECOVERING LITHIUM FROM LEPIDOLITE
Roger Botton, Paris, Jean Paul Delgrange, Le Vesinet, and Andre Steinmetz, Aubervilliers, France, assignors to Compagnie de Saint-Gobain, Neuilly-sur-Seine, France
No Drawing. Filed Feb. 7, 1961, Ser. No. 87,553
Claims priority, application France, Feb. 11, 1960, 818,181
9 Claims. (Cl. 23—32)

This invention relates to the separation of lithium from lepidolite and similar complex minerals in which the lithium is present only in small percent. Lepidolite has the empirical content (Li, K, Na)$_2$Al$_2$(SiO$_3$)$_3$(F, OH)$_2$, and in lepidolite from some sources there is less than 1% lithium by weight. In other lepidolites it may attain 2% by weight. In the gangue accompanying the lepidolite, which will vary in content according to the source of the rock, there are often heavy metals. It is to the recovery of lithium from minerals of such low lithium content that this invention is directed. As lithium mica, lepidolite, is such a mineral the specification will describe the recovery of lithium from it.

It is known in treating lepidolite to use methods of solution involving an attack on the mineral by concentrated sulfuric acid which requires temperatures on the order of 700° C. if a satisfactory yield is to be obtained. For low lithium minerals this involves the use of excessive quantities of heat and industrial equipment of excessive size. If lower temperatures, e.g., 200–300° C., are used the alumina is dissolved, the purification is made difficult, and part of the lithium is retained by the precipitated alumina and lost. An especial difficulty arises, at high temperature and concentration of acid, in that the Na and K contained in the mineral are dissolved and their presence in the liquor at the moment when precipitations of lithium carbonate occur tends to reduce the yield of the process, because the dissolved K and Na ions increase the solubility of LiCO$_3$ in the solution.

It is an object of the invention to reduce the temperature at which lithium bearing minerals are digested in sulfuric acid, to reduce the concentration of the acid employed so as to avoid the use of concentrated H$_2$SO$_4$, to produce a higher yield of Li from low lithium minerals than could be produced by prior methods, and to reduce the size and cost of equipment employed.

The objects of the invention are accomplished, generally speaking, by the extraction of Li from low lithium minerals such as lepidolite by reaction of the mineral with sulfuric acid, in which the Li is finally precipitated from solution, by steps in the formation of the solution from which the Li is to be precipitated which comprise reacting lepidolite with aqueous sulfuric acid of concentration between about 65–75% by weight H$_2$SO$_4$, at a temperature between about 140° and 200° C., and within a range of concentration of about 55 parts H$_2$SO$_4$ by weight to 100 parts of mineral when the mineral contains less than about 1% of Li, and about 100 parts of H$_2$SO$_4$ to 100 parts of mineral when the mineral contains 1.5 to 2% of Li by weight. The temperature of digestion is preferably to be kept between 150° and 170° C.

Under these particular conditions of digestion the attack appears to go forward only on the lepidolite per se and not on the gangue, which results in an early exclusion of elements that would otherwise have found their way into the solution and required later separation. In particular the sodium found in the reaction masses of prior attacks came largely from the gangue, and is not dissolved in the present process. Furthermore only a little alumina and less potassium are dissolved out of the lepidolite because the acid sulfate of aluminum and alums of low solubility in cold water are formed by the attack. Another advantage is in the saving of time in digestion which, at this relatively low concentration of H$_2$SO$_4$ and moderate heat, does not generally exceed 4 hours, a substantial advantage over the hours of the prior process.

Another characteristic and advantage of the new process is that the alumina can be precipitated directly from the bath constituting the product of the acid digestion, without preliminary filtration, by the simple addition of an alkali or alkali-earth carbonate in quantity sufficient to reduce the pH to about 3.5 to 4.5. This precipitates the alumina practically free of lithium which is retained in the filtrate, on subsequent filtration, in the form of dissolved lithium sulfate. The filtrate is treated by prior art methods to recover the lithium, usually by precipitation as a carbonate. It is advantageous to precipitate the alumina (present as a sulfate in the liquor), as aforesaid, by adding a carbonate to the reaction product of the acidification containing the substantially unreacted gangue, as the sludges formed by the gangue assist in the filtration.

During the precipitation of the alumina it is advantageous to add the calcium carbonate, or alkali or alkali-earth carbonate, only little by little over a period of about forty minutes, because this produces the greatest precipitation of alumina without perceptible entrainment of lithium and without decomposing the alums to put potassium into solution.

By this method over 90% of the Li in the mineral is found in the filtrate.

The extraction of Li from the solution after separation of the alumina and gangue can proceed by any known method, notably by the addition of lime water, which will remove any aluminum and any heavy metals by precipitation, followed by the addition of Na$_2$CO$_3$ to remove the remaining lime, then by filtration and concentration of the filtrate to a lithium content of about 17 g./1. From this solution the addition of alkali carbonate precipitates lithium carbonate. The matter in this paragraph is not a novel part of the invention.

Another advantage is that the process is satisfactory without enriching the lepidolite or submitting it to a preliminary internal disintegration.

The following example illustrates the method without limitation on the generalities elsewhere herein stated.

Example

The process of this invention was applied to a mineral, constituted by lepidolite and its gangue containing 0.63% Li, 2.8% K, 1.9% Na, 1.6% F, and 18.9% Al$_2$O$_3$, of which 65 to 70% of the Al$_2$O$_3$ was supplied by the lepidolite and the remainder by the gangue. The mineral was broken to sizes of which 85% passed a 200 mesh screen and 96% passed a 100 mesh screen.

To 1 kg. of this mineral there was added 470 cc. of 72% H$_2$SO$_4$ which supplied 55.5 parts by weight of H$_2$SO$_4$ for each 100 parts by weight of mineral. The digestion mass was heated for 4 hours at 165° C. with slight agitation. The reaction product weighed 1520 g. It was cooled and 1200 cc. of cold water was added to it.

The mass was subjected to disruptive action for several minutes to put the mass into pulp form. To this pulp was added, little by little, 300 g. of $CaCO_3$, the addition taking about 40 minutes, at the end of which the pH was about 4. The cake was filtered and washed with water, producing a solution containing 92% of the lithium content of the mineral, and 99% of the lithium that was dissolved. The composition of this solution was:

3.6 g./l. Li, or 92% of the Li in the mineral,
1.0 g./l. K, or 5.5% of the K in the mineral,
0.7 g./l. Na, or 6% of the Na in the mineral,
1.9 g./l. $Al_2O_3$, or 1.5% of $Al_2O_3$ in the mineral, This solution received 110 g. of lime water containing 20% CaO, which precipitated the heavy metals and the aluminum, it was filtered, and the filtrate received 2.5 g. $Na_2CO_3$ which produced a pH between 10 and 11. This eliminated the calcium, which was removed by filtration. The filtrate was concentrated to bring its Li content up to about 8.5 g./l., then it received 66 g. $Na_2CO_3$ which is one and one half times the amount of $Na_2CO_3$ theoretically necessary to transform the Li to $Li_2CO_3$ which will precipitate. The mass was evaporated to about half its volume and the $Li_2CO_3$ precipitated, and was filtered off, containing 78% of the Li content of the mineral acted on, and 85% of the Li extracted from the mineral. In order to recover yet more of the Li, the filtrate from the last filtration can be treated again.

This process is applicable to all low-lithium minerals containing aluminum. It is useful, also, in the treatment of minerals containing higher lithium contents, but its most important field of operation is in the recovery of lithium from mineral of low lithium content.

The advantages of the invention are the accomplishment of its objective as stated above. A major advantage is the improved yield of Li which is obtained from low-lithium minerals.

As many apparently widely different embodiments of the present invention may be made without departing from the spirit and scope thereof, it is to be understood that the invention is not limited to the specific embodiments.

What is claimed is:

1. In the extraction of Li from low lithium minerals by reaction of the mineral with sulfuric acid, in which the Li is finally precipitated from solution, the steps in the formation of the solution from which the Li is to be precipitated which comprises reacting lepidolite with aqueous sulfuric acid of concentration between about 65–75% by weight $H_2SO_4$ at a temperature between about 140° and 200° C., and within a range of concentrations of about 55 parts $H_2SO_4$ by weight to 100 parts of mineral when the mineral contains less than about 1% of Li, and about 100 parts of $H_2SO_4$ to 100 parts of mineral when the mineral contains 1.5 to 2% of Li by weight.

2. The process according to claim 1 in which the acidity of the reaction mass is reduced by the addition of a metal carbonate to a pH about 3.5 to 4.5, and the precipitate thus formed is separated from the liquid.

3. The process according to claim 1 in which the liquid from the separation is mixed with lime water until the pH increases to about 10 to 11, and the liquid is separated from the precipitate thus formed.

4. The process according to claim 3 in which the liquid is concentrated after the separation of the precipitate from the alkaline solution, and lithium is precipitated as a salt.

5. The process according to claim 4 in which the lithium salt is isolated.

6. A method of extracting lithium from lepidolite containing gangue which comprises digesting the mineral in sulfuric acid of 65 to 75% $H_2SO_4$ by weight, at a temperature between 140° and 200° C., the weight of acid employed being within the range of about 55 parts of $H_2SO_4$ to 100 parts of mineral when the mineral contains less than about 1% of Li and about 100 parts of $H_2SO_4$ to 100 parts of mineral when the mineral contains 1.5 to 2% of Li by weight, reducing the acidity to a value in the range 3.5 to 4.5 pH, isolating the precipitate thus formed from the filtrate, and extracting Li from the filtrate.

7. The method of claim 6 in which the reaction mass of acid and mineral is heated to about 165° C. for about 4 hours and is cooled.

8. The method of claim 7 in which the acidity is reduced by the slow addition of a metal carbonate in quantity sufficient to precipitate any aluminum and heavy metals that may be present.

9. The method of claim 1 in which the temperature is kept between 150° and 170° C. during digestion of the mineral in sulfuric acid.

References Cited by the Examiner
UNITED STATES PATENTS

| | | | |
|---|---|---|---|
| 1,544,114 | 6/25 | Weidmann | 23—26 |
| 2,516,109 | 7/40 | Ellestad et al. | 23—26 X |
| 2,983,576 | 5/61 | Robinson | 23—32 |

OTHER REFERENCES

Hader, "Industrial and Engineering Chemistry," vol. 43, December 1951, pages 2636–2646.

MAURICE A. BRINDISI, *Primary Examiner.*
GEORGE D. MITCHELL, *Examiner.*